2,895,833

PROCESS FOR MAKING MAPLE PRODUCT OF INTENSIFIED MAPLE FLAVOR

Charles O. Willits, Glenside, Joseph Clyde Underwood, Plymouth Meeting, and Harry G. Lento, Philadelphia, Pa., assignors to the United States of America as represented by the Secretary of Agriculture No Drawing. Application April 16, 1958
Serial No. 729,037

2 Claims. (Cl. 99—142)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a product possessing an intensified maple flavor and to the process for its preparation.

The upper grades of maple sirup are characterized by their light color and a delicate, yet distinctive, flavor. Only when large amounts of these sirups are used will they impart this distinctive flavor to other foods. The slightly-stronger flavored lower grade sirups need to be added in substantially the same ratios and they impart to the food the off-flavors which are associated with these sirups. Since all of these grades of commercial maple sirups require that large amounts be added to achieve the desired maple flavor in the product, the result has been a limited usage of maple sirups for flavoring foods because of the attendant formulation problems and the increased cost of the product due to the price of the sirup.

It is known that maple flavor may be enhanced by holding the sirup at about 250° F. This heat treatment, however, also enhances the development of substances which impart acrid, bitter and caramel-like flavors. While these off-flavor materials are more pronounced in lower grade maple sirups, the heat treatment of even the better grades of maple sirup is limited to about two hours or the product will be unsatisfactory because of the concomitant increase in amount of substances which impart these off-flavors. It was suspected that longer heat treatment produced intensification of the maple flavor, but the simultaneous intensification of the off-flavors masked the pure maple flavor. Hence, the "high-flavoring" process has definite limitations and the maple products of that process lack the amount of maple flavor necessary to make these maple products satisfactory for flavoring most foods.

Artificial maple-flavoring products, while intense, do not possess the true full-bodied flavor of natural maple sirup, and, being imitation, their sale is restricted in certain States. Hence, there is a need in the industry for a pure maple product of intense maple flavor.

We have discovered a process for making from maple products such as maple sirup and maple sugar, a new product possessing an intense maple flavor. Flavor intensities are difficult to define, but we have conclusively demonstrated that the product of the present invention is of particular value for use in the flavoring of foods where only a limited amount of additive is tolerated, such as in ice cream. Replacing all sugar in ice cream with commercial maple sirup gives a product with only a very mild maple flavor and a product which is commercially unacceptable because of the expense of the large amount of maple sirup and because of the special formulations involved. Regular "high-flavored" maple sirups are, for flavoring purposes, an improvement over natural maple sirup, but it is still necessary to add a prohibitive amount, about 10%, high-flavored maple sirup to obtain a perceptible flavor. The addition of 2% of the product of the present invention to ice cream produced a decided maple flavor with no off-flavors due to the new product. Our product may also be used as a source of maple flavoring for many other food products.

According to the present invention a maple sirup prepared by a conventional procedure, such as a maple sirup selected from any of the grades of commercial sirups (sap sirups), or a sirup prepared by reconstitution with water from maple sugar (sugar sirups), is heated at about 250° F. for about 3 to 5 hours. Preferably the sirup is concentrated prior to holding at 250° F., the heat treatment is conducted under conditions which prevent or minimize further loss of water, and following the heat treatment the sirup is adjusted to a density of about 65 to 75° Brix by the addition of water. Ethanol in an amount representing about one-fourth the volume of the sirup is added to the heat treated sirup and the mixture is heated (digested) until most of the materials in the sirup which impart acrid, bitter and caramel-like flavors have been rendered inoperative. Unless the digestion is conducted under conditions which prevent loss of ethanol and water, such as under reflux or in a closed container, the addition of water and perhaps ethanol may be necessary, depending upon the temperature maintained and the duration of the digestion step. The alcohol content of the final product is adjusted to a desired level, usually that which will comply with legal requirements for tax-free commodities. The processed sirup is adjusted to a density that is compatible to its end use.

The maple product of this invention is a dark colored sirup having a pleasant odor and a markedly intensified maple flavor. Most unexpectedly, chemical reactions which occur during the alcohol digestion result in a significant reduction of the acrid, bitter and caramel-like flavors from the digestion product, providing a maple sirup of intensified flavor which imparts to foods to which it is added none, or insignificant amounts of, the off-flavors associated with heat treatments, especially those off-flavors associated with heat treatment of the lower grade maple sirups.

The maple sirup used as starting material to prepare the product of the present invention may be, in addition to the usual grades of commercial sirups, a "high-flavored" maple (sap or sugar) sirup. In this instance, the time of holding at about 250° F. may be somewhat reduced. The means of achieving the holding temperature of about 250° F. is most conveniently obtained by concentrating the sirup until it reaches a boiling point of approximately this temperature, then preventing further loss of water for the next 3 to 5 hours. Another means of holding the concentrated sirup at this temperature is by adjustment of the heat source. Alternatively, a non-concentrated sirup, as well as a concentrated sirup, may be held at this temperature by heating under pressures sufficiently above atmospheric to produce the desired holding temperature.

Following atmospheric holding at about 250° F., water is added to the concentrated sirup to improve handling properties and to facilitate reaction of sirup components with the alcohol. The amount of alcohol added should be in excess of that which will react with, or promote chemical reaction of, constituents of the sirup. Although digestion with ethanol is preferably conducted under reflux conditions at about 200° F., the reflux conditions are not necessary to the invention. More ethanol can always be added as desired. Since the reaction with ethanol proceeds over a wide range of temperatures, if reflux conditions are not employed during the digestion step somewhat lower temperatures may be maintained, thereby minimizing the loss of ethanol. This step of the procedure may also be conducted at higher temperatures in a closed container heated in a pressure cooker.

The duration of the alcohol digestion treatment is related to the grade of the original sirup and to the amounts of acrid, bitter and caramel-like materials formed in the heat treating process. In addition to sucrose, invert sugars, organic acid salts and free organic acids, the heat treated sirups used as starting materials in the alcohol digestion step contain various sugar degradation products such as acetol, reductone and dihydroxy acetone. There is some evidence that the caramel-like bodies, which retain aldehyde properties, are polymerization products of the triose products. The chemical reactions involved in the removal of most of the acrid, bitter and caramel-like flavors from the digestion products are at present unknown.

After the alcohol digestion step, excess free alcohol, if present, is removed. A convenient procedure is to add water to the sirup and continue heating in an open container. The alcohol content of the final product is not critical to the invention, and usually as much as is conveniently possible is removed. The water content of the sirup is adjusted to provide a density that is compatible with the proposed end use of the sirup, usually between 65 and 80° Brix.

The practice of the present invention is illustrated by the following examples.

*Example 1*

One gallon of U.S. grade A maple sirup was boiled in a steam heated kettle until the boiling point of the sirup reached 250° F. The concentrated sirup was then maintained at this temperature for 4 hours under conditions which prevented further loss of water. The heat treated sirup was reconstituted to approximately its original volume, one gallon, by adding water, resulting in a sirup of about 67° Brix. One quart of ethanol (95%) was added to the sirup and heating at 150° to 200° F. (steam bath temperatures) was conducted to react the alcohol with the sirup and to begin to evaporate the excess alcohol. After about 4 hours one quart of water was added to the digestion mixture and heating was continued until the volume was about one gallon. The addition of water and subsequent heating step was repeated once more to remove as much as possible of the alcohol.

The product of the above process was an intensely flavored maple sirup, essentially free of acrid, bitter and caramel flavor, and about 15 fold in color in respect to the original grade A sirup.

This sirup of intensified maple flavor was added in the ratio of 2 parts sirup to 98 parts ice cream and produced a decided maple flavor with no noticeable off-flavors. In comparison, it was necessary to add 10% of regular "high-flavor" sirup to the same ice cream stock to obtain a perceptible maple flavor.

*Example 2*

One gallon of U.S. grade A maple sirup was concentrated, heat treated, and reconstituted to about 67° Brix as in Example 1. One quart of ethanol was added and the mixture was heated under reflux at about 200° F. eight hours a day for six days. The reflux condenser was removed, a pint of water was added and the heating continued. As alcohol and water were evaporated more water was added to keep the volume near one gallon. When the alcohol content fell below 10% by volume heating was stopped.

While the product of this example was slightly superior to that of Example 1 in intensity of maple flavor it does not appear that when the starting maple sirup is a good grade of sirup that prolonged alcohol digestion of the heat-treated sirup is justified by the difference in maple flavor of the final product.

*Example 3*

Eight pounds of maple sugar were dissolved in a quart of water by heating the mixture over a low flame. The sirup was heated until its boiling point reached 250° F. Heat treatment, alcohol digestion and removal of alcohol were conducted as described in Example 1.

*Example 4*

Eight pounds of maple sugar were dissolved in a pint of water by heating the mixture in a steam kettle. The resulting sirup was heated under reflux for 4 hours, then alcohol was added and the digestion under reflux and subsequent removal of most of the alcohol was performed as described in Example 2.

The products of intensified maple flavor of Examples 3 and 4 were quite comparable to those of Examples 1 and 2.

*Example 5*

One quart of U.S. grade unclassified maple sirup was heated in a steam kettle until a boiling point of 253° F. was reached. This sirup was heated for 3 hours under reflux to avoid further loss of water. The heat-treated sirup was reconstituted with water to about 67° Brix and placed in a two liter flask. One-half pint 95% ethanol was added and the mixture was digested under reflux on a steam bath eight hours a day for 5 days. The reflux condenser was removed and the heating continued to remove alcohol. As the volume of the sirup fell below one quart water was added in half-pint quantities. Heating was stopped after the alcohol content fell to less than 10%, volume basis.

The product had an intensified maple flavor. There were noticeably more off-flavors than in the products of the previous examples (1 to 4), but this product is acceptable for flavoring foods. The long period of digestion with alcohol is considered preferable when the starting material is a sirup of the grade used in this example.

*Example 6*

One quart of U.S. grade B maple sirup was sealed in a can with a pint of ethanol. The can was heated for 4 hours at about 15 p.s.i.g. steam pressure, as that obtained in an autoclave or pressure cooker. The contents of the cooled can were poured into an open container and heated on a steam bath to remove the alcohol. As the heating progressed, water was added to keep the volume at about 1 quart. When the alcohol content reached less than 10% by volume the sirup was removed from the steam bath and adjusted to about 66° Brix.

While the maple flavor was noticeably increased, this product did not have the intense maple flavor of other products such as those of Examples 1 and 2, and was not considered suitable for flavoring purposes.

*Example 7*

One gallon of U.S. grade A maple sirup was concentrated, heat treated for 4 hours, and reconstituted to about 67° Brix as in Example 1. One quart of ethanol was added to the heat treated sirup, the alcohol-sirup mixture placed in a container which was then sealed, and the sealed container placed in an autoclave and heated for one hour at 15 p.s.i.g. steam pressure. After cooling, the container was removed from the autoclave, opened, and the alcohol content of the sirup reduced as in Example 1.

The maple sirup product was quite similar in all respects to that of Example 1 and hence an excellent material for imparting maple flavor to foods to which it was added. The use of a higher temperature during the alcohol digestion step did not, however, result in a product superior to that of Example 1.

The examples cited show that when a better grade sirup, relatively low in caramel is used, as in Examples 1, 2 and 7, the amount of undesirable flavor materials formed in the heat treating process are relatively low. Only a few hours of alcohol digestion is required to reduce the level of these undesirable flavor materials to the point where they impart negligible or noticeable off-flavors and insufficient amounts to obscure the intensified maple flavor in the food to which the sirup is added. When lower grades of maple sirup, as in Example 5, are used as the starting material, the procedure of Example 1 is not satisfactory. The alcohol digestion must be continued for several days. In an instance not listed in the examples, the amount of acrid, bitter and caramel-like materials which developed during concentration and heat-treating of a lower grade sirup was so great that the digestion with alcohol was maintained for more than a week before the undesirable flavor constituents had been reduced to a satisfactory level for the sirup to be added to foods as a source of maple flavor.

We claim:

1. A process for preparing a maple product of intensified maple flavor comprising heating a maple sirup at a temperature of about 250° F. for about 3 to 5 hours and, if necessary, adding water to adjust the density of the heat-treated sirup to about 65 to 75° Brix, adding to the heat-treated sirup a volume of ethanol in excess of that which will react with and promote chemical reactions of constituents of the heat-treated sirup, heating the alcohol-sirup mixture until most of the materials in the sirup which impart acrid, bitter and caramel-like flavors have been rendered inoperative, and adjusting the water and alcohol content of the alcohol digestion product to provide a maple product of intensified maple flavor of the desired density and alcohol content.

2. A process for preparing a maple product of intensified maple flavor comprising heating a maple sirup until the boiling point of said sirup reaches about 250° F., holding the concentrated maple sirup at this temperature for about 3 to 5 hours, adding water to adjust the density of the heat-treated sirup to about 65 to 75° Brix, adding to the heat-treated sirup a volume of ethanol in excess of that which will react with and promote chemical reactions of constituents of the heat-treated sirup, heating the alcohol-sirup mixture until most of the materials in the sirup which impart acrid, bitter and caramel-like flavors have been rendered inoperative, and adjusting the water and alcohol content of the alcohol digestion product to provide a maple product of intensified maple flavor of the desired density and alcohol content.

References Cited in the file of this patent

UNITED STATES PATENTS

| | | |
|---|---|---|
| 1,961,714 | Skazin | June 5, 1934 |
| 2,054,873 | Whitby | Sept. 22, 1936 |
| 2,549,877 | Willits et al. | Apr. 24, 1951 |